July 23, 1963

R. E. WAUGH 3,098,664

PLASTIC PIPE

Filed Jan. 7, 1958

INVENTOR
ROBERT E. WAUGH
BY Diggins & Le Blanc
ATTORNEYS

July 23, 1963 R. E. WAUGH 3,098,664
PLASTIC PIPE
Filed Jan. 7, 1958 2 Sheets-Sheet 2
Fig. 5.
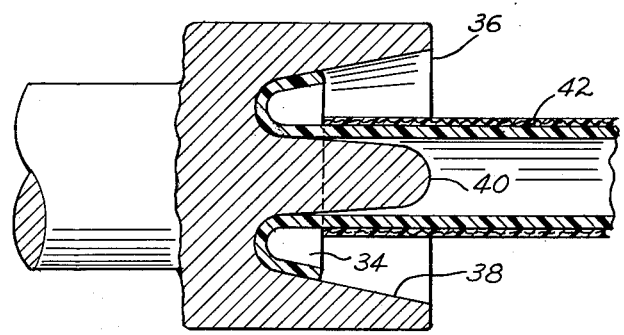
Fig. 6.
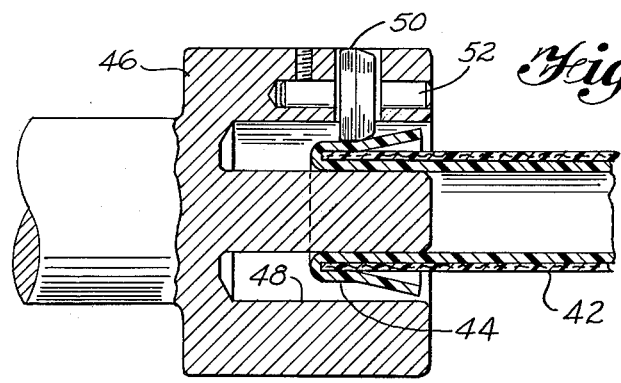
Fig. 7.
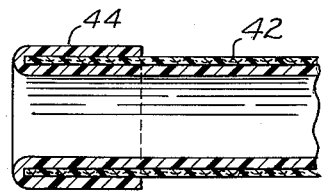
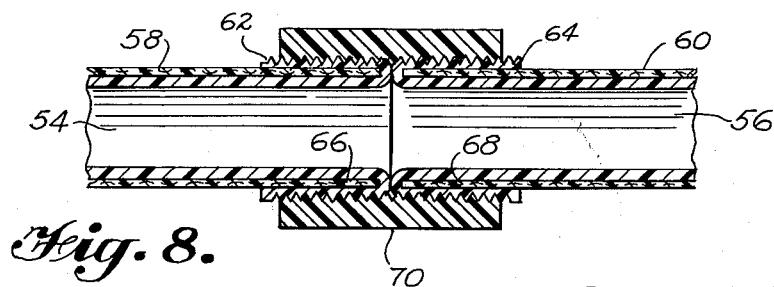
Fig. 8.
INVENTOR
ROBERT E. WAUGH
BY
Diggins & LeBlanc
ATTORNEYS

3,098,664
PLASTIC PIPE
Robert E. Waugh, Camp Hill, Pa., assignor to The Englander Company, Inc., Baltimore, Md., a corporation of Delaware
Filed Jan. 7, 1958, Ser. No. 707,579
5 Claims. (Cl. 285—55)

This invention relates to an improved armored pipe and joint therefor and an improved method of manufacturing such pipe and forming such joint.

In assignee's co-pending application Serial No. 516,216, filed June 17, 1955, and now abandoned, there is disclosed a fiber reinforced synthetic resin pipe and a special joint arrangement for such pipes. Pipes of this type are lightweight, inexpensive and resistant to a large variety of fluids and gases and the fabric reinforcement provides a great degree of strength. As pointed out in the aforementioned co-pending application, this pipe may be of two different types. According to one construction it may consist of a fabric sleeve impregnated with a synthetic resin which gives shape and structural strength to the conduit. According to a second construction, the fabric sleeve may be disposed over a more or less rigid thin wall conduit of various materials and impregnated with a further plastic armor. In each case the outer plastic was dipped, painted or sprayed onto the fabric and formed a generally rough outer surface.

While pipes of these types have found usage in industry, two problems have been encountered. With pipe of the first type, which consists of a fabric sleeve impregnated with resin, it has been found difficult to eliminate at least some degree of porosity so that it has been practically impossible to form an effective vapor barrier. With the other type of pipe, wherein an inner tube is reinforced with resin impregnated fabric to form a double wall construction, there is a definite possibility of leakage at the joints due to the double wall construction. Further, while the aforementioned co-pending application discloses a method of forming joints in such pipes, this method entails the use of fabric sleeves and uncured resin which is cured at the time of making the joint. Considerable equipment is necessary for the formation of the joints and while the method is satisfactory, it leaves something to be desired in convenience and speed. Threaded joints have been relatively impractical in that leakage between the double walls is again encountered and also it is difficult to provide satisfactory threads where the thread must cut through the fabric.

According to the present invention it has now been found that the foregoing difficulties may be substantially overcome through a pipe construction and method of manufacture which facilitates a particular manner of forming pipe joints. According to the invention the ends of a thermoplastic tube are plugged and a fabric sleeve is stretched taut over the tube. Uncured liquid resin is then applied to the fabric and the fabric is wrapped with a smooth tape. The liquid resin is then cured and the tape removed to expose a smooth surfaced armor. The fabric reinforced resin is trimmed away from the ends of the tube to expose the thermoplastic tube and the end plugs are removed.

Heat is then applied to the distended ends of the thermoplastic tube and these are folded back about the fabric reinforced armor coating and spun into a snug collar thereabout. This effectively seals the double wall construction so as to prevent leakage and provides a satisfactory surface for receiving screw threads. The pipe thus formed provides an effective vapor barrier and individual pieces of the pipe may be coupled together by means of more or less conventional screw threaded couplings engaging the threaded ends of the pipes. The former rough appearance of the pipes is eliminated and replaced with a smooth surface.

It is accordingly a primary object of the present invention to provide an improved synthetic resin armored pipe and method of manufacturing the same.

It is another object of the invention to provide an improved synthetic resin armored pipe which may be coupled by screw threaded couplings or other standard types of couplings which are both mechanically strong and leak proof.

It is another object of the invention to provide an improved joint between synthetic resin armored pipes.

It is another object of the invention to provide an improved method for manufacturing synthetic resin armored pipe which may be joined to other lengths of the same type of pipe in leak proof joints.

These and further objects and advantages of the invention will become more apparent upon reference to the following specification and claims and appended drawings wherein:

FIGURE 5 is a vertical section showing the bending over of the tube end to provide a collar on the end of the pipe being manufactured;

FIGURE 6 is a vertical elevation showing the final portion of the collar forming step;

FIGURE 7 is a partial vertical section showing pipe manufactured according to the invention after the ends of the thermoplastic tube has been turned back over the fabric reinforced synthetic resin armor; and FIGURE 8 is a vertical section showing two pipes of the type shown in FIGURE 7 joined together by means of a screw threaded coupling.

According to the method of forming synthetic resin fabric reinforced piping disclosed in assignee's aforementioned co-pending application Serial No. 516,216 (now abandoned), a fabric sleeve is pulled over the tubing and is then impregnated with a suitable synthetic resin by dipping, painting or spraying, with spraying being disclosed as the most satisfactory manner of application. The tubes utilized are disclosed in that application as being of synthetic resin, metal or glass.

Figure 1:
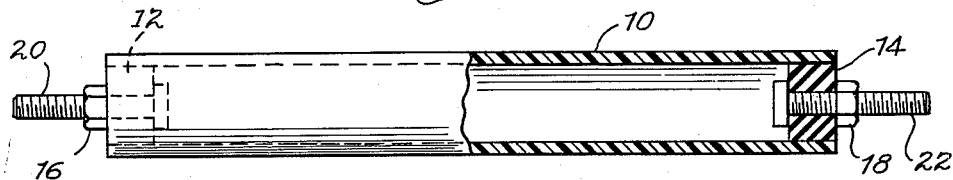
FIGURE 1 is a vertical elevation of a thermoplastic tube having its ends plugged in accordance with one embodiment of the first step of the process of this invention.

According to the present invention it is necessary that the tubing used in the first step of forming the pipe must be of a thermoplastic material and the first step of the process comprises plugging the tube ends. This may be done in any suitable manner and one such manner is shown in FIGURE 1. According to this method of plugging the tube ends a thermoplastic tube 10 has a pair of resilient plugs 12 and 14 inserted in the ends thereof and then made fast by tightening nuts 16 and 18 on screws 20 and 22. The screws 20 and 22 pass through apertures in the center of plugs 12 and 14 so that tightening of the nuts upon the screws causes the periphery of the plugs to expand into tight engagement with the interior walls of the tube. Another satisfactory manner of plugging the tube ends is shown in FIGURE 2 wherein a thermoplastic tube 24 has a mandrel 26 inserted therein and extending therethrough.

Figure 2:
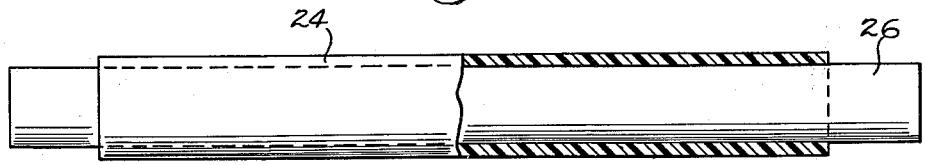
FIGURE 2 is a vertical elevation of a thermoplastic tube having its ends plugged by the insertion of a mandrel according to another embodiment of the first step of the method of this invention.
Figure 3:
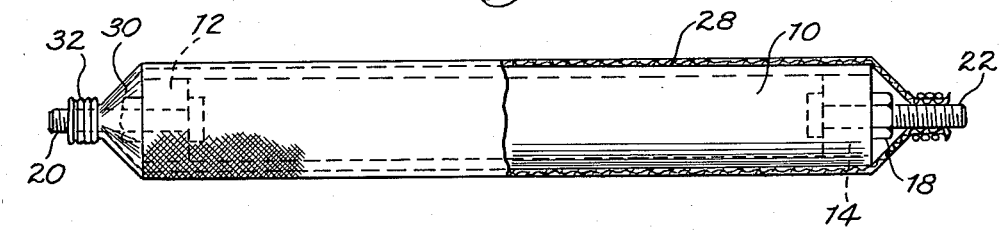
FIGURE 3 is a vertical elevation showing the tube of FIGURE 1 with a knit sleeve stretched taut thereover according to the second step of the method of the invention.

After the ends of the tube are plugged either by the method shown in FIGURE 1 or by that shown in FIGURE 2, a fabric sleeve, which is preferably a knit fiber glass sleeve 28, is pulled over one end of the tube 10. The end 30 of the fiber glass sleeve is tied to the screw 20 at 32 and the sleeve stretched taut over the tube and secured to the other screw 22. The fiber glass sleeve 28 is then impregnated with a liquid resin by dipping, painting or spraying. The resin used is not critical but is preferably a polyester or epoxy thermosetting resin, or similar resins. While this resin is still soft and uncured the pipe is wrapped with a smooth tape such as "cellophane" tape to form a smooth exterior surface on the resin. The resin is then cured at the temperature dictated by the particular resin used and the tape is removed to reveal a smooth pipe surface.

Figure 4:
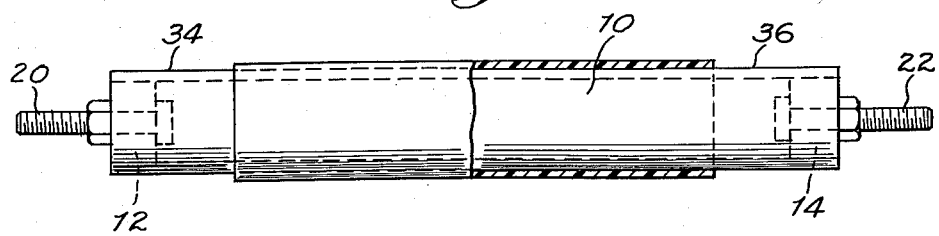
FIGURE 4 is a vertical elevation showing the fabric reinforced resin armored tube of FIGURE 3 after the resin armor has been cured and trimmed back from the edges of the tube.

The fiber glass reinforced coating is trimmed away from the ends of the thermoplastic tube approximately six inches, as shown at 34 and 36 in FIGURE 4, and the ends of the tube are unplugged either by removing end plugs 12 and 14 or mandrel 26 as the case may be. The extending end 34 of the thermoplastic tube is then inserted into a heated die 37 which raises the temperature of the thermoplastic tube to a thermoplastic condition. The die 37 is provided with a conical cavity 38 having a tapered nub 40 at the center thereof. The tube end 34 is inserted into the cavity 38 over the nub 40 and allowed to reach a thermoplastic temperature. The heated die may then be rotated as the tube is advanced into the cavity, so as to spin the tube end 34 backwardly over the fiber glass reinforcing synthetic resin armor layer 42.

The folded over end portion 34 is then folded completely down against the fiber glass reinforced synthetic resin armor layer 42 as shown at 44 to form the collar 44 as shown in FIGURE 7. This last molding operation may be accomplished in any manner which will be apparent to those skilled in the art, and one satisfactory manner of doing this is the spinning method shown in FIGURE 6. Referring to that figure, the tube is removed from the die 36 shown in FIGURE 5 and is inserted into a second die 46 having a cavity 48 and having a roller 50 pivotally mounted therein on an axle 52. The die 46 is provided with any conventional means for raising its temperature and is mounted for rotation.

As the die 46 is rotated the wheel 50 rolls around the folded over portion 44 of the end of the tube to bring this portion into engagement with the surface of the fiber glass reinforced synthetic resin armor layer 42. The tube is fed into the die 46 until the folded over portion is completely in engagement with the fiber glass reinforced synthetic resin armor layer 42, as shown in FIGURE 7.

The other end of the pipe may then be treated in a similar manner to form a fabric reinforced synthetic resin pipe of a two ply thickness having collars 44 at the ends thereof. These collars may be threaded to receive a coupling to join two lengths of the pipe together. Thus referring to FIGURE 8 there are shown a pair of thermoplastic tubes 54 and 56 having fabric reinforced synthetic resin armor coverings 58 and 60. The thermoplastic tubes 54 and 56 are folded back over the ends of the fabric reinforced synthetic resin armor to form the collars 62 and 64. These collars are threaded as shown at 66 and 68 and receive a threaded coupling 70 which joins the two pipe ends together. The folded over end structure of the pipe prevents leakage between the double wall pipe and the pipe itself is provided with a smooth surface through the use of tape during the forming of the fabric reinforced synthetic resin armor layer. The pipe is effectively vapor impenetrable and possesses a high degree of strength.

The thermoplastic tube utilized according to this invention may be flexible, semi-rigid, or rigid and may be of any desired inside diameter, outside diameter, wall thickness and length. The thermoplastic tube should be at least one foot longer than the required finished length to take care of the bending back of the ends in the manufacture of the pipe lengths.

It will be apparent from the foregoing that there has been disclosed an improved fabric reinforced synthetic resin armored pipe susceptible of forming leak proof threaded joints. The double wall thickness of the pipe minimizes the danger of gas leakage but does not lead to leakage at the joints due to the double wall construction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A pipe comprising a thermoplastic tube, a fabric sleeve snugly enclosing said tube and impregnated with a resin, said resin having a smooth outer surface, said tube having ends folded back over said impregnated fabric to form collars of said thermoplastic material at each end of said pipe, said collars being provided with male threads.

2. A pipe comprising a pair of axially alined thermoplastic tubes, a pair of fabric sleeves enclosing said tubes and impregnated with resin, each of said tubes having ends folded back over said impregnated fabric to form collars of said thermoplastic material, one collar on one tube being in contact with one collar on the other tube, said contacting collars being screw threaded, and a threaded coupling joining said threaded collars and tubes together.

3. A method of manufacturing pipe comprising the steps of stretching a fabric sleeve over a thermoplastic tube, impregnating said sleeve with an uncured resin, curing said resin, cutting said fabric back from the end of said tube to bare said tube, heating the bared end of said tube, and folding the bared end of said tube back over said fabric to form a collar of thermoplastic material over said fabric.

4. A method of manufacturing pipe comprising the steps of stretching a fabric sleeve over a thermoplastic tube, impregnating said sleeve with an uncured resin, wrapping said uncured resin on said tube with a smooth tape, curing said resin, removing said tape to leave a smooth resin surface, cutting said fabric back from the end of said tube to bare said tube, heating the bared end of said tube, and folding the bared end of said tube back over said fabric to form a collar of thermoplastic material over said fabric.

5. A method of manufacturing pipe comprising the steps of plugging the ends of a thermoplastic tube, stretching a fabric sleeve over said tube and the plugged ends thereof, impregnating said sleeve with an uncured resin, wrapping said uncured resin on said tube with a smooth tape, curing said resin, removing said tape to leave a smooth resin surface, cutting said fabric back from the end of said tube to bare said tube, unplugging the end of said tube, heating the bared end of said tube, and folding the bared end of said tube back over said fabric to form a collar of thermoplastic material over said fabric.

References Cited in the file of this patent

UNITED STATES PATENTS

| | | |
|---|---|---|
| 99,018 | Smith | Jan. 18, 1870 |
| 1,282,160 | Young | Oct. 22, 1918 |
| 2,230,067 | Pedlow | Jan. 28, 1941 |
| 2,288,391 | Carman | June 30, 1942 |
| 2,417,586 | Crosley | Mar. 18, 1947 |
| 2,525,070 | Greenwald et al. | Oct. 10, 1950 |
| 2,646,822 | Ferguson | July 28, 1953 |
| 2,653,887 | Slayter | Sept. 29, 1953 |
| 2,693,222 | Krupp | Nov. 2, 1954 |
| 2,703,109 | Saville | Mar. 1, 1955 |
| 2,709,668 | Thompson | May 31, 1955 |
| 2,726,682 | Conroy et al. | Dec. 13, 1955 |
| 2,751,237 | Conley | June 19, 1956 |
| 2,752,953 | Schmidt | July 3, 1956 |
| 2,779,996 | Tanis | Feb. 5, 1957 |
| 2,782,806 | Stambaugh et al. | Feb. 26, 1957 |
| 2,876,154 | Usab | Mar. 3, 1959 |
| 2,888,042 | St. John et al. | May 26, 1959 |
| 2,943,967 | Simon | July 5, 1960 |

FOREIGN PATENTS

| | | |
|---|---|---|
| 155,120 | Australia | Feb. 8, 1954 |
| 771,368 | Great Britain | Apr. 3, 1957 |